United States Patent [19]
Yamamoto et al.

[11] Patent Number: 5,136,446
[45] Date of Patent: Aug. 4, 1992

[54] APPARATUS FOR MOVABLY SUPPORTING AND POSITIONING A TRANSDUCER

[75] Inventors: Hajime Yamamoto, Moriguchi; Makoto Kuwamoto, Hirakata, both of Japan

[73] Assignee: Matsushita Electric Industrial Co., Ltd., Osaka, Japan

[21] Appl. No.: 457,952

[22] Filed: Dec. 27, 1989

[30] Foreign Application Priority Data

Dec. 27, 1988 [JP] Japan .................. 63-332882

[51] Int. Cl.⁵ .................. G11B 5/55; G11B 21/08
[52] U.S. Cl. .................. 360/106; 369/244
[58] Field of Search .................. 360/106; 369/219, 244, 369/249, 255

[56] References Cited

U.S. PATENT DOCUMENTS

| | | |
|---|---|---|
| 4,374,402 | 2/1983 | Blessom et al. |
| 4,670,804 | 6/1987 | Kant et al. |
| 4,775,907 | 10/1988 | Shtipelman .................. 360/106 |
| 4,868,696 | 9/1989 | Hammer .................. 360/106 |

FOREIGN PATENT DOCUMENTS 56-163559 12/1981 Japan .
63-257968 10/1988 Japan .

OTHER PUBLICATIONS

IBM T.D.B, vol. 31, No. 3, Aug. 1988, pp. 259–260; "Bow-Like Linear Actuator Employ'g Pretensioned Syst. of Suspensions", c/360, sub. 106.
Patent Abstracts of Japan, Unexamined Applications, Section P, vol. 11, No. 164, May 27, 1987, The Patent Office Japanese Government, p. 117 P 580; Kokai-No. 61-296 536, Dec. 27, 1986, T. Tatsuno, Canon Inc.
Patent Abstracts of Japan, Unexamined Applications, Section P, vol. 11, No. 118, Apr. 14, 1987, The Patent Office Japanese Government, p. 67 P 567; Kokai-No. 61-264 524, Nov. 22, 1986, T. Tatsuno, Canon Inc.
Patent Abstracts of Japan, Unexamined Applications, Section P, vol. 10, No. 34, Feb. 8, 1986, The Patent Office Japanese Government, p. 149 P 427; Kokai-No. 60-182 570, S. Kobayashi, Matsushita Denki Sangyo K.K.

*Primary Examiner*—A. J. Heinz
*Attorney, Agent, or Firm*—Wenderoth, Lind & Ponack

[57] ABSTRACT

A transducer driving apparatus symmetrically supports a transducer with soft members each being elastically deformed into circular-arc shape about an axis in a direction perpendicular to the transferring direction of the transducer. The rigidity of each of the soft members is strengthened by extremely narrowing its width in the radial direction of the circular-arc shape and by expanding its width in the center-axial direction. The soft members perform the caterpillar-like function to move a transducer to a predetermined position at an extremely fast speed with high precision to complete positioning.

12 Claims, 8 Drawing Sheets

APPARATUS FOR MOVABLY SUPPORTING AND POSITIONING A TRANSDUCER

BACKGROUND OF THE INVENTION

1. Field of the Invention

The present invention relates to an apparatus for movably supporting and positioning a transducer which performs magnetic, or optical or other conversion of signals from one physical state to another. Such an apparatus can be used, for example, in a data recording and reproducing system, such as a magnetic disk drive or an optical disk drive.

2. Description of the Prior Art

Recently, modern disc apparatuses record data on a recording medium at a very high density and/or reproduce data from such a medium. A transducer driving apparatus is utilized to position a recording/reproducing head at an extremely fast speed and with a high precision on the track of the recording medium.

Referring now to the accompanying drawings, an example of a conventional transducer driving apparatus is described below, which is disclosed, for example, in the Japanese Patent Publication No. 63-119026 of 1988.

FIG. 7 illustrates an example of a conventional optical transducer driving apparatus. Typically, the conventional optical transducer driving apparatus includes a chassis 32 which is secured to an optical head mechanism of an optical data recording and reproduction apparatus by an appropriate means. The L-shaped supporting base 34 is secured to the chassis 32.

One end of the elastic plate springs 36a and 36b are respectively secured to both ends of the L-shaped supporting base 34. These elastic plate springs 36a and 36b are respectively provided with slits to facilitate deforming thereof into a bellows form.

The other end of the elastic plate springs 36a and 36b are respectively secured to the opposite sides of the rigid interim member 38. One end of the elastic springs 40a and 40b are respectively secured to the upper and bottom surfaces of the rigid interim member 38. The other end of the elastic plate springs 40a and 40b are respectively secured to the upper and bottom surfaces of the lens holder 44 holding the lens 42 which focuses and radiates a light beam onto a recording medium to implement recording or reproduction of data.

As shown in FIG. 7, the focus-drive coil 46 for driving the lens 42 in the focussing (z-axial) direction is secured to the external lateral surface of the lens-holder 44. Furthermore, four units of the tracking-drive coil 48 are secured to the external circumferential surface of the focus-drive coils 46. These four tracking-drive coils 48 are provided for driving the lens 42 in the tracking (y-axial) direction. An end of the power-feeding wire 49 for feeding drive current to these tracking-drive coils 48 is secured to the chassis 32.

A magnetic circuit (having one side which is not shown in FIG. 7) is composed of the permanent magnet 50 and the magnetic yoke 52 and is installed in a position opposite the coils 46 and 48 in the x-axial direction.

Referring now to FIGS. 7 through 9, the functional operation of the conventional transducer driving apparatus incorporating the above mechanism is described below.

As shown in FIG. 7, when the power is delivered to the focus-drive and tracking-drive coils 46 and 48, electromagnetic force is generated by the magnetic circuit composed of the permanent magnet 50 and the magnetic yoke 52. As a result, the plate springs 36a, 36b, 40a and 40b elastically deform to drive the lens 42 in the tracking (y-axial) direction and the focussing (x-axial) direction.

Next, the function of the plate springs 36a and 36b deforming into a bellows form is described below.

FIG. 8 is the plan view designating the deformed status of the plate springs 36a and 36b of the conventional transducer driving apparatus. As shown, when driving the lens holder 44 in the tracking (y-axial) direction, the plate springs 36a and 36b deform themselves into a bellows form on the plane by the effect of the slits provided therefor. Nevertheless, since the above structure provides such slits 60 for deforming the plate springs 36a and 36b into a bellows form in the tracking (y-axial) direction, the rigidity of these plate springs 36a and 36b in the focussing (x-axial) direction is insufficient. In particular, due to the weight of the movable part at the tip edge of the lens 42, when the deformed volume grows in the tracking (y-axial) direction, a moment force is generated in the periphery of the x-axis. This in turn causes the plate springs 36a and 36b to incur torsion. As a result, the optical axis of the lens 42 falls, thus resulting in an unstable control over the tracking/focus positioning. To solve these problems, a conventional art has been introduced to prevent the occurrence of torsion by reinforcing the thickness of the plate spring. On the other hand, although torsion can hardly be generated when reinforcing the thickness of the plate spring, oscillation proper to the plate spring increases to result in a lowered DC sensitivity in the tracking (y-axial) direction.

In other words, expansion of the thickness of the plate spring conversely increases the power consumption per unit transfer.

Even when the length of the plate spring is extended to solve the problem, such counteracts the needs for providing a compact transducer driving apparatus. Further, when transferring the movable part of the tip edge of the lens 42, the power-feeding wire 49 behaves as the externally disturbing load which adversely affects the high-precision positioning of the transducer driving apparatus.

To dispense with the plate spring, conventionally, it is known to support the movable unit by means of a bearing. However, due to the mass of the bearing and the load caused by the friction force of the bearing, actually, the weight of the movable unit can hardly be reduced, and yet, the movable unit cannot easily access at a very fast speed. Furthermore, any conventional transducer driving apparatus cannot be positioned with extreme precision because of the wobble of the bearing and resonance generated by the twisted movable unit.

SUMMARY OF THE INVENTION

An object of the invention is to provide a compact transducer driving apparatus which can securely transfer a movable unit in the tracking (y-axial) direction at a very fast speed with an economic power consumption to stably and precisely position the transducer at a predetermined spot.

To achieve the above object, the transducer drive apparatus of the present invention includes a chassis, a movable unit which is movable relative to the chassis and which has mounted thereon, for example, a magnetic or optical head, and a supporting structure for supporting the movable unit movably in a specified direction. The supporting structure includes a first member which is fixed to the chassis and which has a flat surface parallel to the moving direction of the movable unit, a second member which is fixed to the movable unit and which has a flat surface oppositely parallel to the flat surface of the first member, and at least one supporting member having first, second and third portions. The first portion of the supporting member is secured to the flat surface of the first member, the second portion of the supporting member is secured to the flat surface of the second member, and the third portion of the supporting member extends from the first and second portions and is deformed into a circular-arc shape about an axis perpendicular to the moving direction of the movable unit so as to be rigid in the direction parallel to the axis and flexible in the moving direction of the movable unit.

By virtue of the provision of the structure mentioned above, a compact transducer driving apparatus embodied by the invention stably supports the conversion means and executes the positioning at an extremely fast speed and with a high precision.

DESCRIPTION OF THE PREFERRED EMBODIMENTS

Referring now more particularly to the accompanying drawings, the first embodiment of the transducer driving apparatus of the invention is described below.

Figure 1:
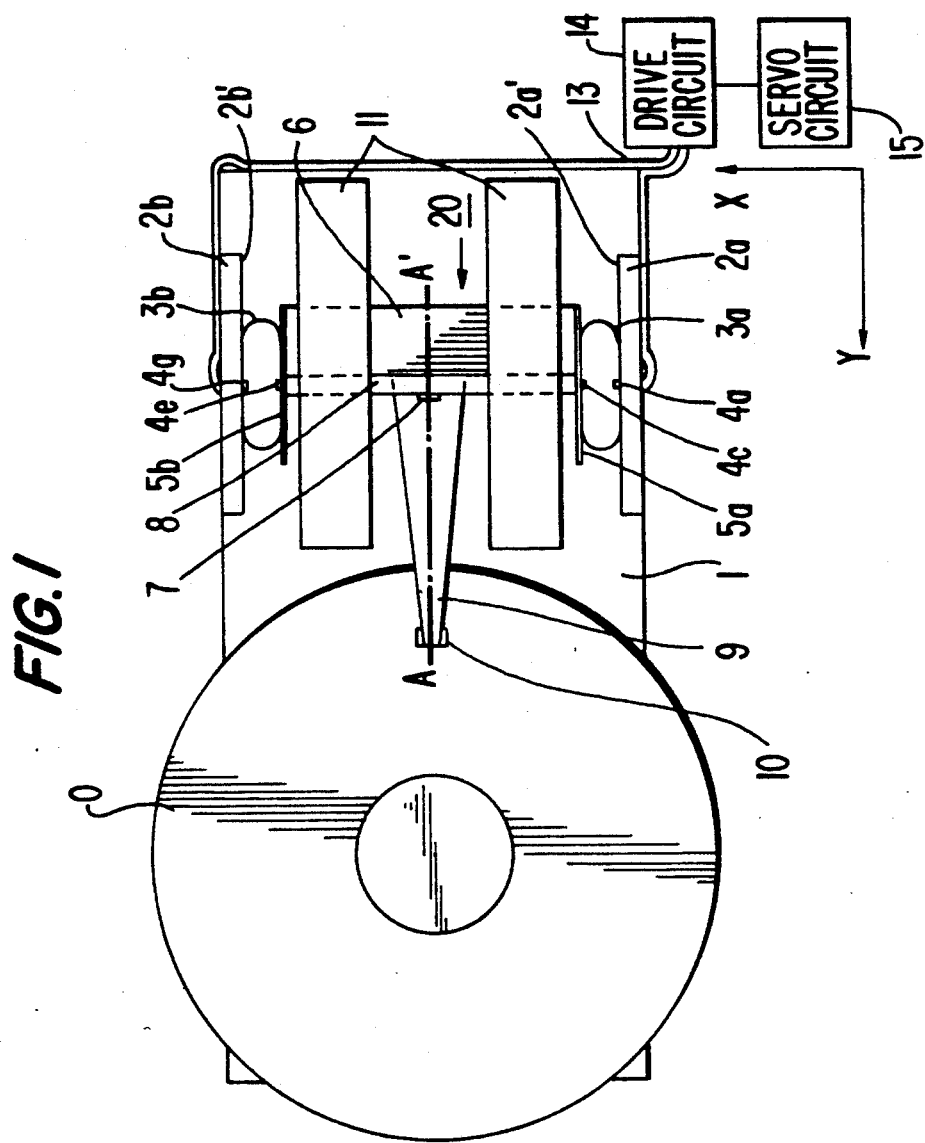
FIG. 1 is a plan view of a first embodiment of a transducer driving apparatus according to the invention.
Figure 2:
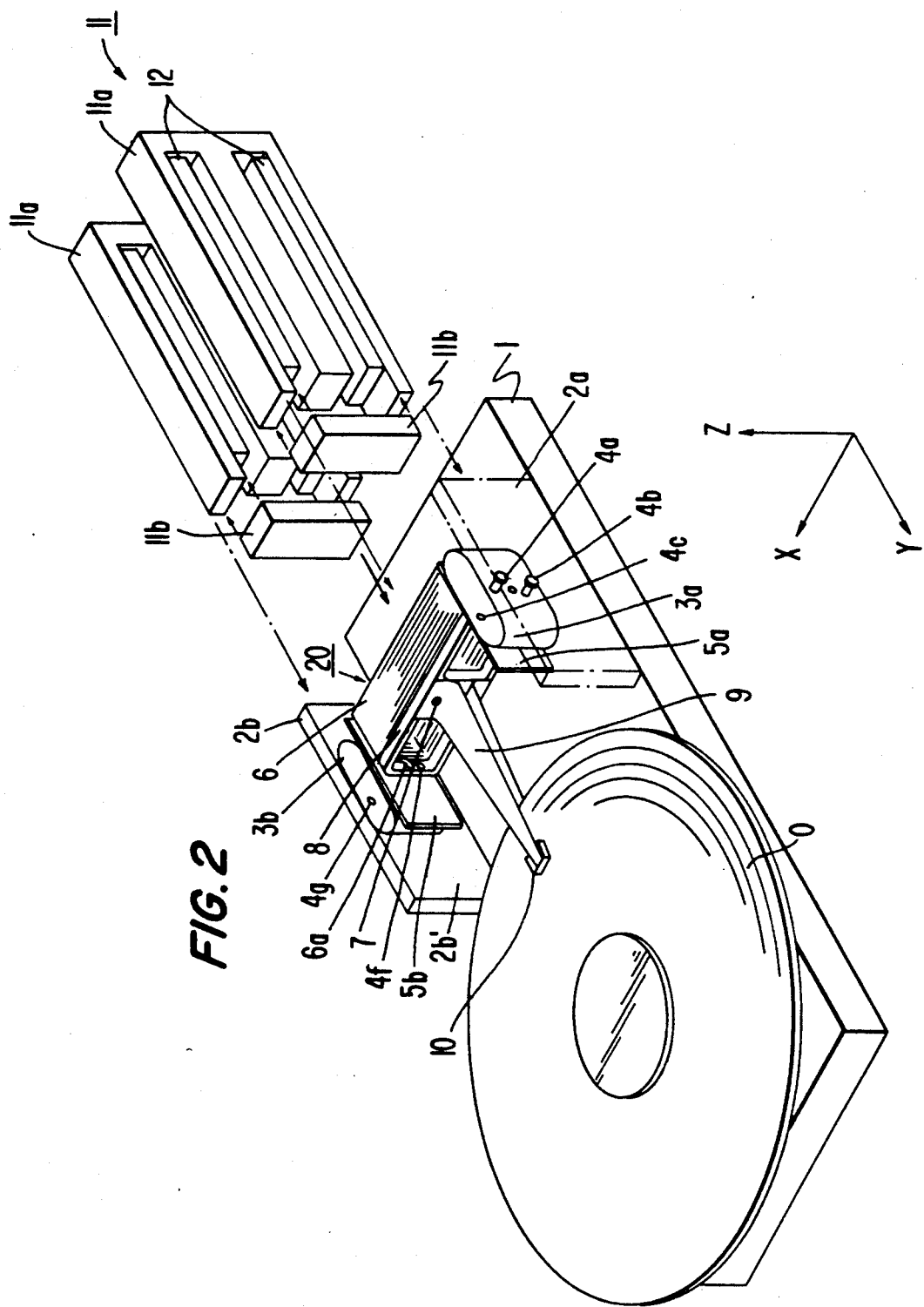
FIG. 2 is a perspective view of an essential part of the first embodiment.
Figure 3:
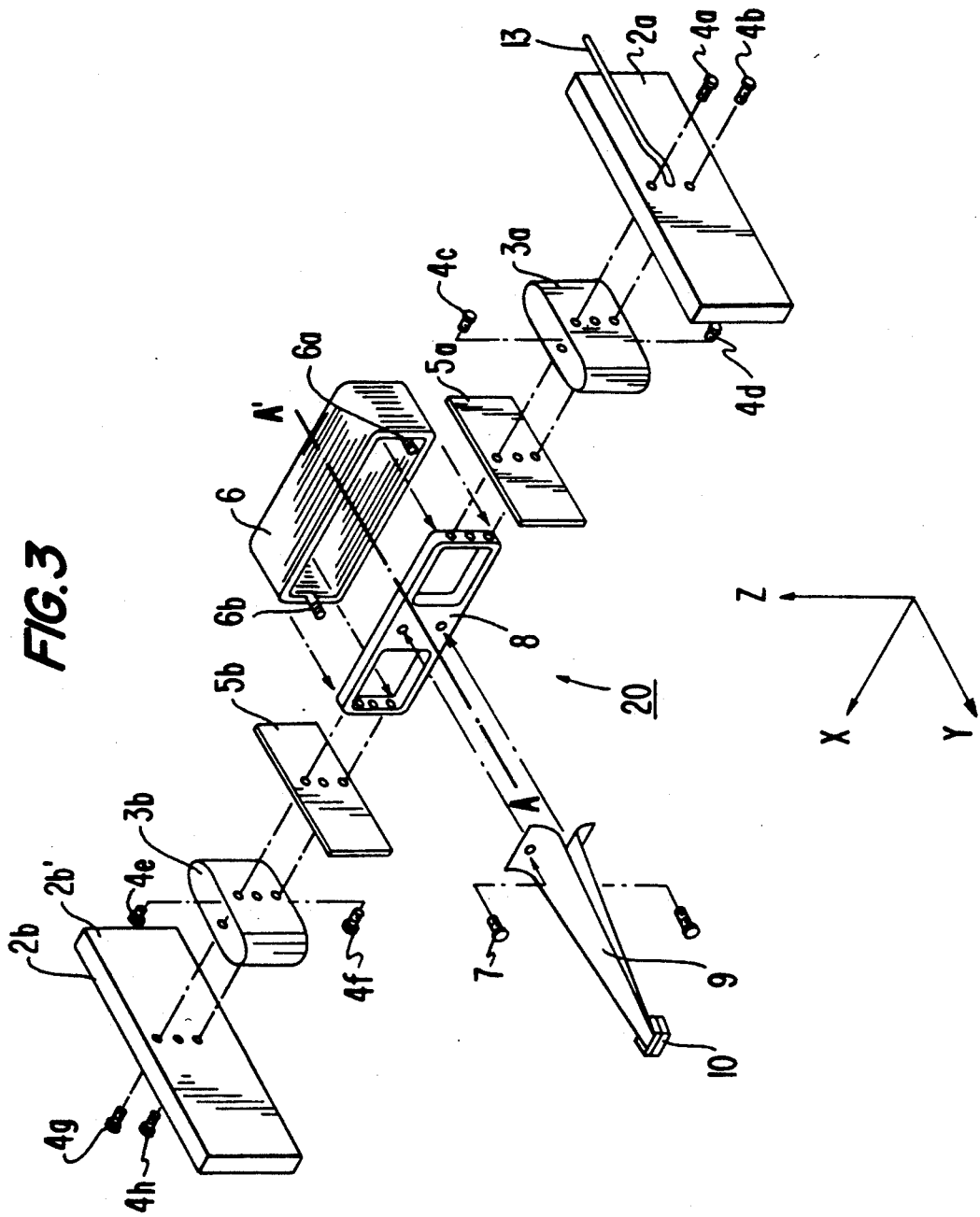
FIG. 3 is an exploded perspective view of the essential part of the movable unit of the magnetic transducer driving apparatus reflecting the first embodiment of the invention.

FIG. 1 is a plan view of the first embodiment, which is a magnetic transducer driving apparatus, according to the invention. FIG. 2 is a perspective view of an essential part of the transducer driving apparatus. FIG. 3 is an exploded perspective view of an essential part of a movable unit of the magnetic transducer driving apparatus.

Spring-supporting bases 2a and 2b are secured to a chassis 1, which are symmetrically disposed across the axial line A—A' and in parallel with the tracking (y-axial) direction of the magnetic disc 0 and provided with vertical planes 2a' and 2b' being in parallel with each other in the axial direction. In FIG. 2, one-side view of the spring-supporting base 2a is omitted.

Plate springs 3a and 3b are each made of a loop-shaped electrically conductive metal, where each of the rectangular thin sheets composing these plate springs is partially and elastically deformed into a circular-arc shape having its center on an axial line which is in parallel with the focussing (z-axial) direction. The plate spring 3a is secured at one side thereof to the spring-supporting base 2a with plate-spring fixing members 4a and 4b, and at the other side thereof to the movable unit 20 with plate-spring fixing members 4c and 4d. The plate spring 3b is secured at one end thereof to the spring-supporting base 2b with plate spring fixing members 4g and 4h, and at the other end thereof to the movable unit 20 with plate-spring fixing members 4e and 4f. The plate springs 3a and 3b support the movable unit 20 at the positions symmetrical to the axial line A—A' in parallel with the tracking (y-axial) direction in which the movable unit 20 moves. Each of the plate springs 3a and 3b is about 30 [μm] in thickness and about 10 [mm] in width. There is an extremely small ratio between the thickness and the width.

Back plates 5a and 5b respectively support the plate springs 3a and 3b at the side of the movable unit 20. Each of the back plates 5a and 5b is made of a rectangular thin plate whose longitudinal direction extends in the tracking (y-axial) direction. One surface of the back plates 5a and 5b are respectively secured to the movable unit 20 with the plate-spring fixing members 4c and 4d and the plate-spring fixing members 4e and 4f. The other surface of the back plates 5a and 5b respectively cause the plate springs 3a and 3b to be elastically deformed by pressing the plate springs 3a and 3b in the direction parallel with the x-axial direction. As a result, the back plates 5a and 5b respectively remain in contact with and support the linear portion of the plate springs 3a and 3b. The surfaces of the back plates 5a and 5b in contact with the plate springs 3a and 3b are respectively disposed in parallel with the opposing parallel surfaces 2a' and 2b' of the spring-supporting bases 2a and 2b.

As is clear from the above description, each circular-arc shape portion of each of the plate springs 3a and 3b is formed such that the center (located on an axial line which is in parallel with the focusing direction) of the circular-arc shape is located at a middle position between the opposing surfaces of the corresponding spring support base (2a and 2b) and back plate (5a or 5b).

The both ends of a fixing member 8 are respectively secured to the plate springs 3a and 3b with the fixing members 4c through 4f.

A magnetic head 10 which records data onto and reproduces the recorded data from the magnetic disc 0 by conversion of a magnetic physical quantity into an electric signal is secured to a flexure 9 which is composed of a thin sheet which is flexible in the focussing (z-axial) direction.

A driving coil 6 drives the magnetic head 10 in the magnetic-disc tracking (y-axial) direction. The driving coil 6 is secured to the fixing member 8 so that the axial line A—A' passing through the center of gravity of the fixing member 8 in parallel with the tracking (y-axial) direction can be positioned in the center of the coil, and thus, the driving coil 6 drives the center of gravity of the fixing member 8.

A plurality of permanent magnets 12 for providing magnetic field for the driving coil 6 in the focussing (z-axial) direction are respectively secured to a pair of magnetic yokes 11 forming magnetic paths. The pair of magnetic yokes 11 each being composed of magnetic yoke members 11a and 11b are symmetrically secured to the chassis 1 across the axial line A—A'.

The fixing member 8 secures the flexure 9 holding the magnetic head 10 on its one surface with a flexure-fixing member 7, and in addition, the fixing member 8 also secures the driving coil 6 on its the other surface. Furthermore, the fixing member 8 also secures the spring-supporting bases 2a and 2b on its sides, thus integrally composing the movable unit 20. The flexure 9 and the driving coil 6 on opposite surfaces of the fixing member 8 respectively have masses which are almost equivalent to each other. Since the spring-supporting bases 2a and 2b are also symmetrically secured against the tracking (y-axial) direction across the fixing member 8 present in the center, the mass of the movable unit 20 is almost evenly balanced with respect to the tracking (y-axial) direction. Concretely, the center of gravity of the movable unit 20 almost corresponds to the center of gravity of the fixing member 8, and the plate springs 3a and 3b symmetrically support the center of gravity of the movable unit 20 at both sides.

Power-feeding wires 13 deliver driving current to the driving coil 6 of the movable unit 20. One end of the power-feeding wires 13 are connected to a drive circuit 14 which supplies the driving current, whereas the other end of the power-feeding wires 13 are respectively connected to the electrically conductive plate springs 3a and 3b via through holes of the spring-supporting bases 2a and 2b. The drive circuit 14 is connected to a control circuit 15 which outputs a position-control command signal in a known manner. The ends 6a and 6b of the driving coil 6 are respectively connected to the conductive plate springs 3a and 3b at both sides via through holes of the fixing member 8.

Figure 4:
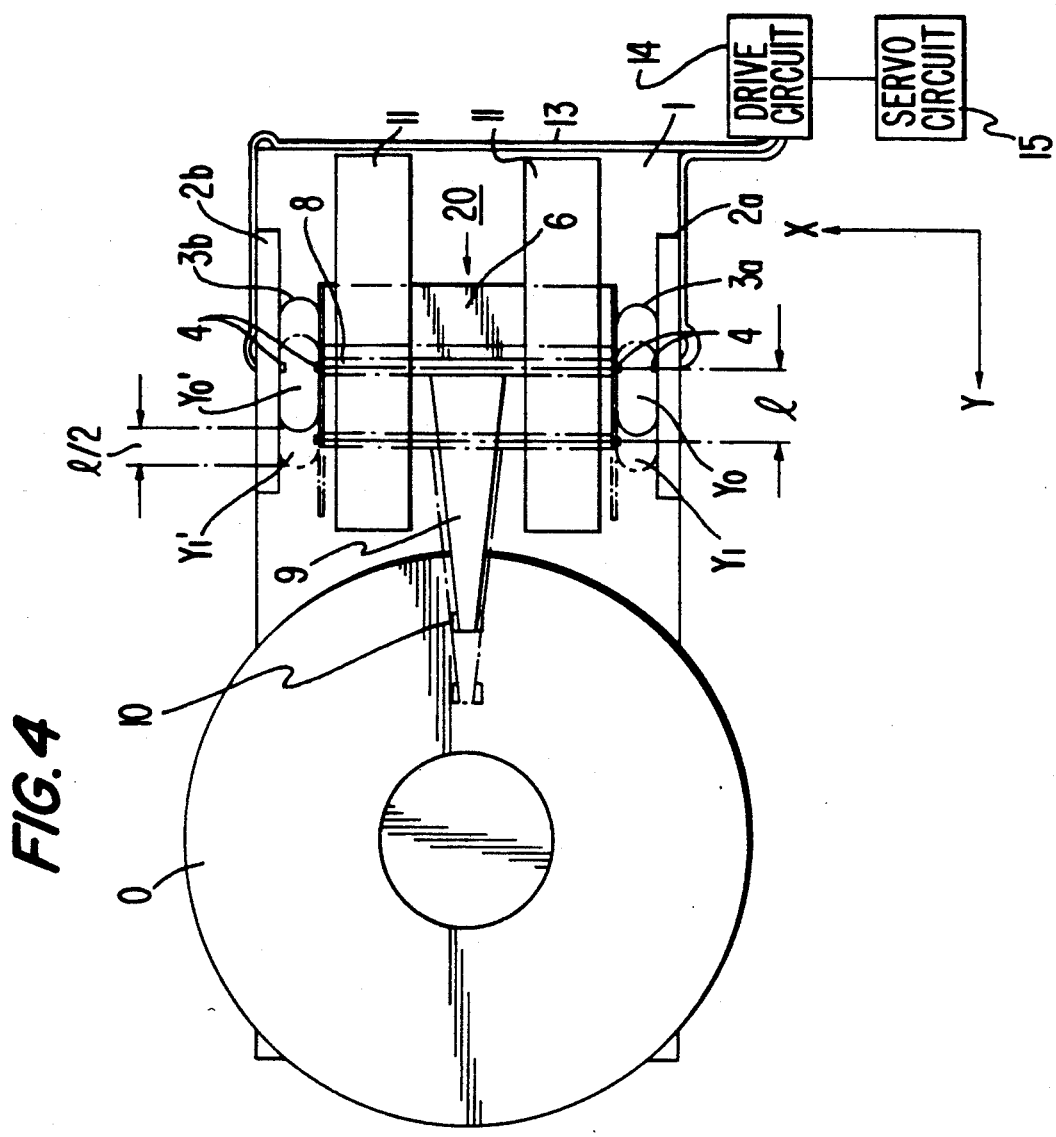
FIG. 4 is a plan view of the essential part of the magnetic transducer driving apparatus reflecting the first embodiment of the invention in a state when the magnetic transducer has just moved.

Next, referring now to FIG. 4 illustrating a plan view of the essential part of the magnetic transducer driving apparatus in a state in which the movable unit 20 having mounted thereon the magnetic head 10 is moved, the functional operation of the magnetic transducer driving apparatus incorporating the above mechanism is described below.

First, the control circuit 15 outputs the position control command signal to the drive circuit 14, which then delivers the driving current to the power-feeding wires 13. Driving current flowing through the power-feeding wires 13 is supplied to the drive coil 6, which is secured to the movable unit 20, via the conductive plate springs 3a and 3b. As a result, the movable unit 20 is driven in the tracking (y-axial) direction so that the magnetic head 10 moves to a predetermined spot to be positioned so that data can be recorded on or reproduced from the magnetic disc 0.

FIG. 4 illustrates the state in which the center position of the fixing member 8 shifts from the $Y_0$—$Y_0'$ line to the $Y_1$—$Y_1'$ line by a distance l. The broken line designates the portion shaded by the magnetic yoke 11. The solid line designates the state in which the fixing member 8 is at the $Y_0$—$Y_0'$ position. The one-dot-and-dash line designates the state in which the fixing member 8 is at the $Y_1$—$Y_1'$ position.

As mentioned earlier, the plate springs 3a and 3b are merely secured at the positions where the plate-spring fixing members 4a through 4h are present, and are elastically deformed into circular-arc shapes between the spring supporting base 2a and the back plate 5a and between the spring-supporting base 2b and the back plate 5b, having surfaces in parallel with each other and being opposite to each other. As shown in FIG. 4, when the movable unit 20 moves by distance l, each of the circular-arc portions of the plate springs 3a and 3b moves by the distance corresponding to one-half the moving distance of the movable unit 20, or by l/2. Since the plate springs 3a and 3b respectively move along the spring-supporting bases 2a and 2b and the back plates 5a and 5b, the movable unit 20 can linearly move. In this way, by transferring the elastically deformed circular-arc portions, each of the plate springs 3a and 3b respectively perform a caterpillar-like movement to move the movable unit 20 in the tracking (y-axial) direction to the predetermined position.

The caterpillar-like movement means that the curvature of the circular-arc shape portion of the plate spring is substantially constant during the movement, and that the distance between the opposing surfaces of the spring support base and back plate is constant during the movement. Further, it would be easily understood that, during the movement, the center of the circular-arc shape of the plate spring moves along a line which extends in the direction parallel to the moving direction of the moving unit at the middle between the opposing surfaces of the spring support base and back plate.

Since the first embodiment of the invention forms circular-arc portions by elastically deforming each of the plate springs 3a and 3b into a circular-arc shape about the axial line in parallel with the focussing (z-axial) direction, the rigidity of these plate springs in the focussing (z-axial) direction is extremely large.

Furthermore, when the movable unit 20 moves in the tracking (y-axial) direction, the circular-arc portions of the plate springs 3a and 3b (where the circular-arc portions are elastically deformed in the direction of weak flexural rigidity) are also shifted in the longitudinal direction of the plate springs so that they can continuously deform elastically. While this movement is underway, the plate springs 3a and 3b are respectively held by the spring supporting bases 2a and 2b and the back plates 5a and 5b which are in parallel with each other, and thus, independent of the position of the movable unit 20, the circular-arc shape portions of the plate springs 3a and 3b deform equally. As a result, independent of the position of the movable unit 20, the system can smoothly and linearly move the movable unit 20 in stable posture while stably supporting it throughout a wide transferable range in the tracking (y-axial) direction.

Based on the same reasoning, the transferable amount of the movable unit 20 per unit driving current remains almost constant independent of the position of the movable unit 20, thus facilitating the designing of the control circuit. Driving current is delivered to the movable unit 20 through the electrically conductive plate springs 3a and 3b functioning as a power-feeding line without installing additional power-feeding wires. This in turn saves the number of components and simplifies the construction. In addition, it eliminates adverse influence of an externally disturbing load like the oscillation of additional powerfeeding wires if provided.

The movable unit 20 is symmetrically supported by the fixing member 8 which is substantially the center of gravity of the movable unit 20. The movable unit 20 is driven in the direction passing through the center of gravity by means of the driving coil 6 which is secured to the movable unit 20 so that the center of gravity of the movable unit 20 can become the center of the driving coil 6. Due to this arrangement, the system can stably transfer the movable unit 20 without generating resonance (which adversely affects the position control effect) to achieve the position control with extreme precision.

Each of the plate springs 3a and 3b is composed of an extremely thin sheet, and thus has very weak flexural rigidity in the elastically deformed thin direction. As a result, reaction force of the spring is very weak when moving the movable unit 20. By properly balancing the mass of the driving coil 6 with that of the flexure 9 mounting the magnetic head 10 in order to accord the center of gravity of the movable unit 20 with that of the thinly composed fixing member 8, the weight of the movable unit 20 can be reduced without adding a mass balancer. Furthermore, since each of the back plates 5a and 5b is composed of a thin plate having the longitude in the tracking (y-axial) direction, the weight of the movable unit 20 can be reduced furthermore by preserving the rigidity in the tracking (y-axial) direction without causing unnecessary resonance to occur. By virtue of these reasons, the movable unit 20 can correctly be transferred to the predetermined position at an extremely fast speed even by applying a very weak driving current.

The first embodiment uses the elastically deformable metallic plate springs 3a and 3b for composing the supporting means. However, the first embodiment does not confine the available material merely to those elastically deformable metallic plate springs, but such a soft member like paper without elastic deformation for example, is also usable for composing the supporting member by deforming it into circular-arc shape and strengthening the supporting rigidity to allow it to stably support the movable unit 20. This also provides satisfactory effect identical to that as described above.

The first embodiment composes supporting means by applying electrically conductive metallic plate springs 3a and 3b which simultaneously serve as the power-feeding components. However, the first embodiment does not confine the available material merely to these conductive metallic plate springs, but the material for composing supporting means may not necessarily be of electrically conductive material. Even though multiple-layer supporting means were composed of non-conductive material combined with conductive wires, it will also provide satisfactory effects identical to the above.

Figure 5:
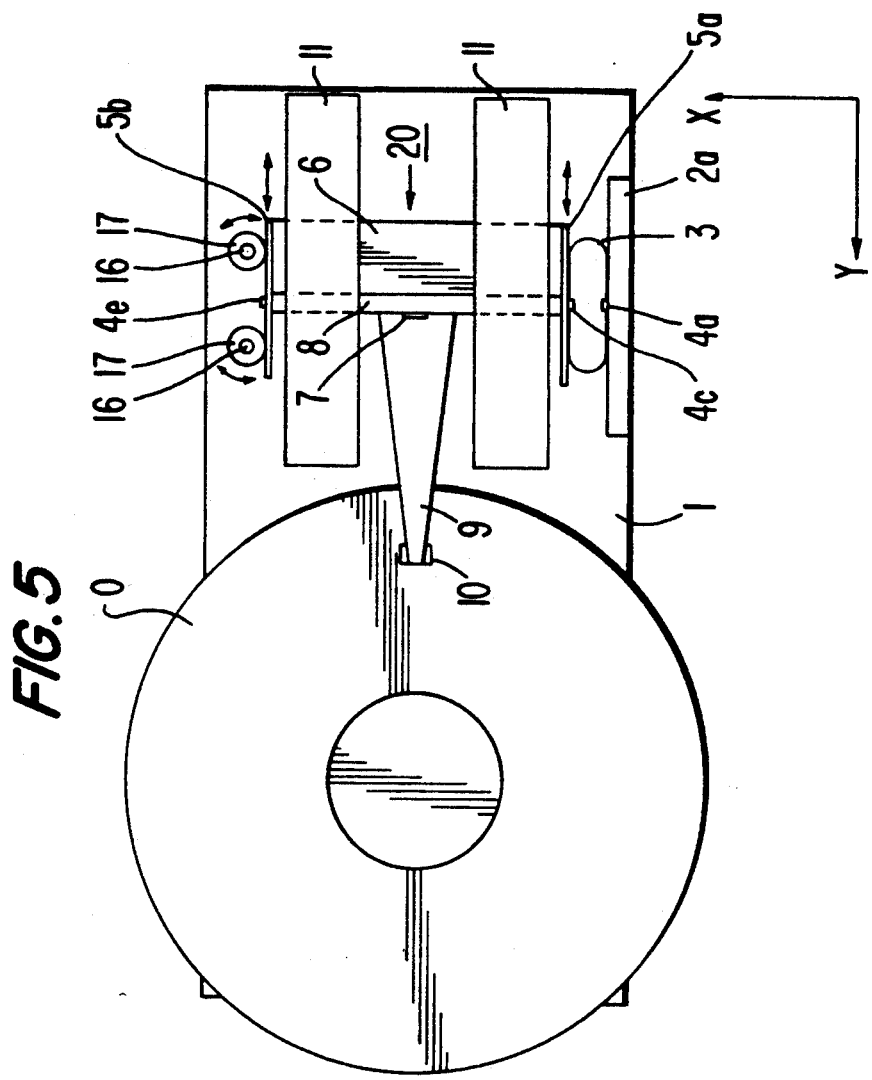
FIG. 5 is a plan view of an essential part of a magnetic transducer driving apparatus reflecting a second embodiment of the invention.

Referring now to FIG. 5, a second embodiment of the transducer driving apparatus according to the invention is described below.

FIG. 5 is a plan view of an essential part of a magnetic transducer driving apparatus reflecting the second embodiment of the invention. Since only the way of supporting one side of the movable unit 20 is distinct from the first embodiment, in order to avoid duplication, only the distinction from the first embodiment is described below.

A pair of bearing posts 16 are vertically secured to the chassis 1.

A pair of ball bearings 17 are secured to these bearing posts 16, where the external circumferential surfaces of these ball bearings 17 and the lateral surface of the back plate 5b secured to the movable unit 20 remain in contact with each other to support the movable unit 20. When the movable unit 20 moves in the tracking (y-axial) direction, the ball bearings 16 respectively support the movable unit 20 by rotating themselves so that the movable unit 20 can move. When this operation is underway, as was done for the first embodiment, the plate spring 3 (the supporting member) on the other side of the movable unit 20 supports the movable unit 20 while transferring the circular-arc position.

Since it is also possible in the second embodiment to reduce the weight of the movable unit 20 and the reaction force of spring in the tracking (y-axial) direction, the movable unit 20 can be moved at a very fast speed even when applying weak driving current. Concretely, the second embodiment may use a combination of supporting means comprised by the circular-arc-shaped plate spring 3 with another supporting means comprised by the ball bearings 17. In this case, the another supporting means may not always be confined to the ball bearings 17, but it may also be comprised by pneumatic bearings, magnetic bearings, or plate springs of other shapes.

Figure 6:
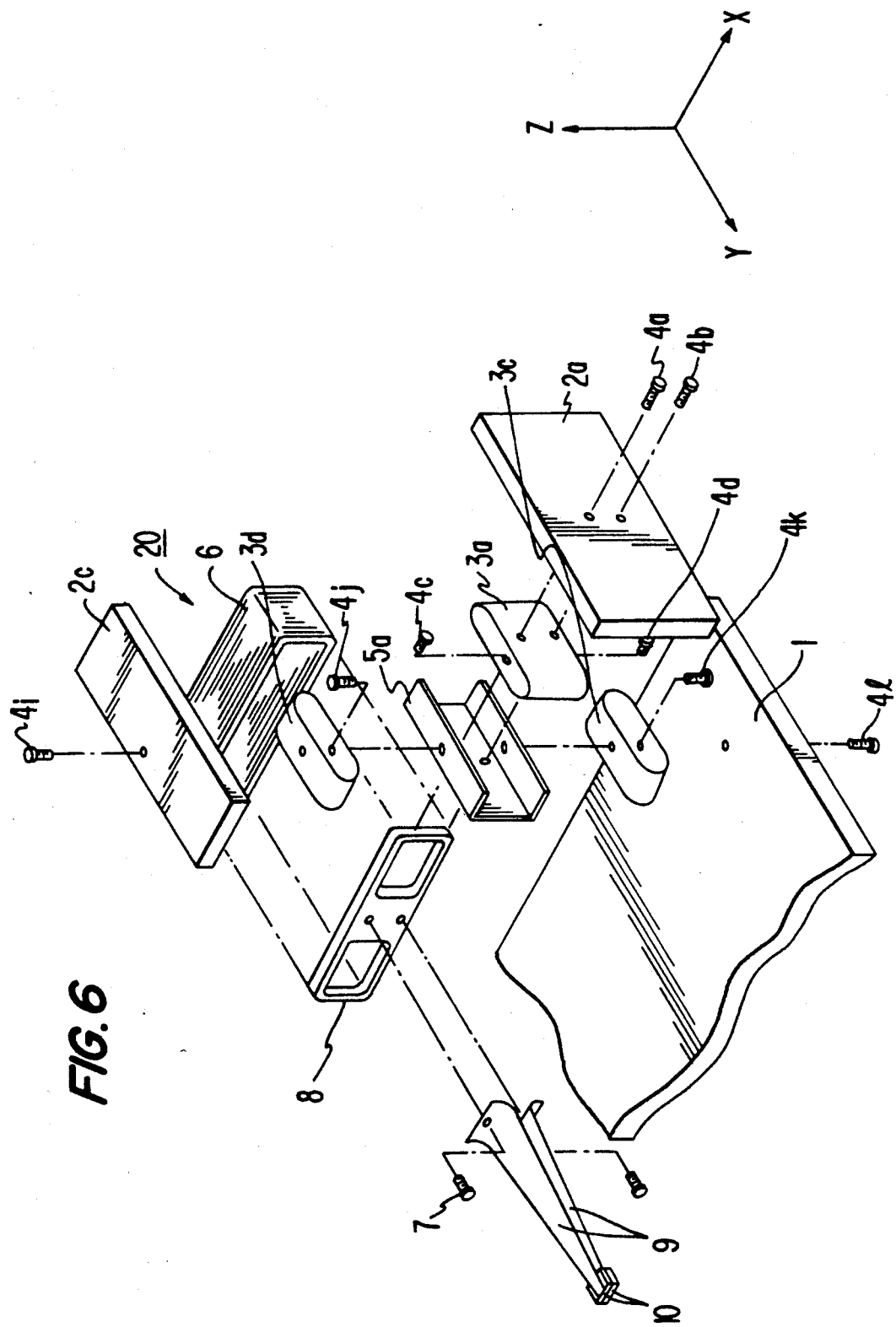
FIG. 6 is an exploded perspective view of an essential part of a magnetic transducer driving apparatus reflecting a third embodiment of the invention.
Figure 7:
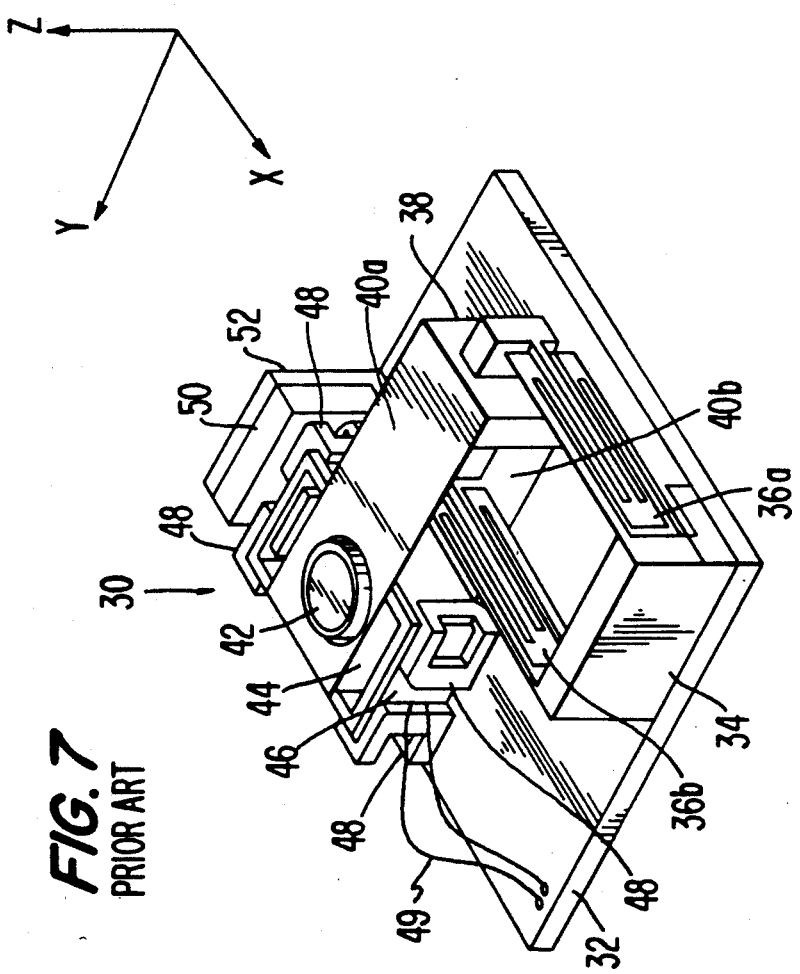
FIG. 7 is a perspective view of an essential part of a conventional optical transducer driving apparatus.
Figure 8:
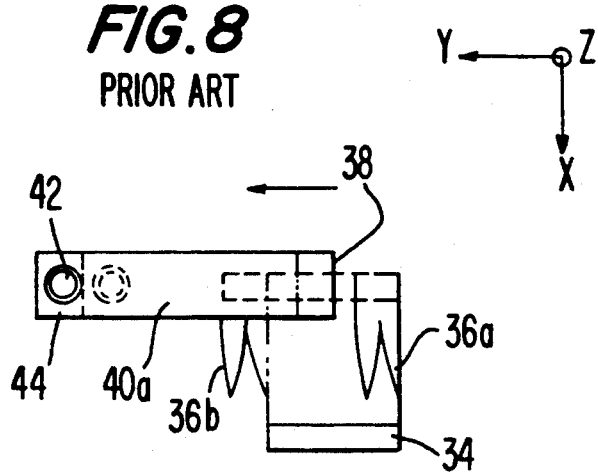
FIG. 8 is a plan view showing a state of the deformed plate spring of the conventional optical transducer driving apparatus.
Figure 9A:
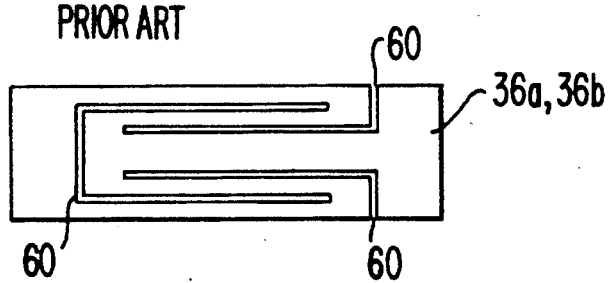
FIGS. 9(a) and (b) are plan views showing a slit-provided state of the plate spring of the conventional optical transducer driving apparatus.
Figure 9B:
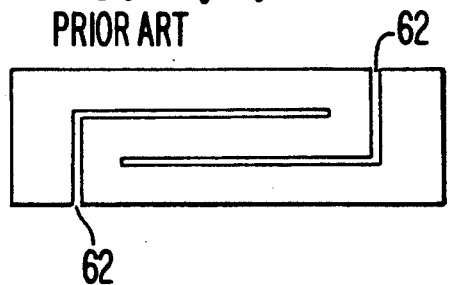

Next, referring to FIG. 6, a third embodiment of the transducer driving apparatus according to the invention is described below. In particular, the following description merely refers to the differences from the first embodiment. FIG. 6 is an exploded perspective view of an essential part of a magnetic transducer driving apparatus reflecting the third embodiment of the invention. Illustration of the supporting means on one side of the movable unit 20 is omitted. However, the supporting means are properly provided on both sides in symmetry.

Unlike the rectangular flat shape used for the first embodiment, the third embodiment uses the rectangular-sectional (U-shaped) back plate 5a which is secured to the fixing member 8. On the other hand, like the first embodiment, the third embodiment uses the plate spring 3a which is elastically deformed into the circular-arc shape. One side of the plate spring 3a remains in contact with the spring-supporting base 2a and the other side in contact with the internal surface of the back plate 5a. The plate spring 3a is secured to the movable unit 20 with the plate-spring fixing members 4c. Furthermore, the plate spring 3a is supported by the internal surface of the back plate 5a with which it remains in contact.

A spring-supporting base 2c is secured to the spring-supporting base 2a which secures the plate spring 3a with the fixing members 4a and 4b. Likewise, the spring-supporting base 2c secures a plate spring 3d with a plate spring fixing member 4i. The chassis 1 secures a plate spring 3c with a plate-spring fixing member 4l.

The plate springs 3c and 3d are of a structure identical to that of the plate spring 3a. One side of the plate springs 3c and 3d are secured to the chassis 1 and the spring-supporting base 2c so that the center axis of the circular-arc-shaped elastically deformed portion can remain in parallel with the x-axial direction, whereas the other sides are secured to the upper and bottom surfaces of the back plate 5a at the side of the movable unit 20. Concretely, the third embodiment supports the movable unit 20 by means of the plate springs 3c and 3d provided on the upper and bottom surfaces of the movable unit 20 in addition to the provision of the circular-arc-shaped plate springs 3a and 3b on both sides of the movable unit 20 as was done for the first embodiment.

The functional performance of the third embodiment of the transducer driving apparatus is described below.

When transferring the movable unit 20, like the movement of the circular-arc portion of the plate springs 3a and 3b in the first embodiment, the vertically disposed plate springs 3c and 3d respectively support the movable unit 20 by transferring the circular-arc portions.

The third embodiment provides quite satisfactory effects almost identical to that a achieved by the first embodiment. Furthermore, since the plate springs 3c and 3d above and below the movable unit 20 ar elastically deformed in the periphery of the axial line which is in parallel with the x-axial direction, the supporting in the rigidity x-axial direction is strengthened. As a result, the stability of the posture of the movable unit 20 in the x-axial direction can be promoted.

Furthermore, since the plate spring 3a is supported by remaining in contact with the internal surface of the rectangular-sectional back plate 5a, the system can more stably support the plate spring 3a against the focussing (z-axial) direction. Since the plate spring 3a can easily be positioned inside of the back plate 5a while the assembly process is underway, assembling convenience can also be promoted.

Some preferred embodiments have thus been described. The conversion means may not be the magnetic head, but may be an optical head, a magneto optical head or any other device, which performs conversion, or transformation of a physical signal from one physical state to another. Furthermore, an electromagnetic conversion system may also be used for composing the driving means. Not only those embodiments thus described above, but a number of variable embodiments are also practically possible.

What is claimed is:

1. A transducer driving apparatus comprising:
    a chassis of said apparatus;
    a movable unit movable relative to said chassis and having mounted thereon a conversion means for converting one physical state of a physical signal to another different physical state;
    at least one supporting means for supporting said movable unit movably in a specified moving direction, said supporting means comprising: a first member fixed to said chassis and having a flat surface which is parallel to the moving direction of said movable unit; a second member fixed to said movable unit and having a flat surface which is opposed and parallel to the flat surface of said first member; and at least one supporting member having a first portion secured to the flat surface of said first member, a second portion secured to the flat surface of said second member, and a third portion extending from said first and second portions and deformed into a circular-arc shape about an axis which is located in a middle area between said flat surfaces of said first and second members and perpendicular to the moving direction of said movable unit so as to be rigid in a direction parallel to said axis and flexible in the moving direction of said movable unit; and
    driving means mounted on at least one of said movable unit and said chassis for causing said movable unit to move in the moving direction to a desired position.

2. A transducer driving apparatus as set forth in claim 1, wherein said supporting member comprises an elastic member.

3. A transducer driving apparatus as set forth in claim 1, wherein said supporting member comprises an electrically conductive member serving as a part of an electric signal line.

4. A transducer driving apparatus as set forth in claim 1, wherein said driving means comprises an electromagnetic driving means for electromagnetically generating a driving force.

5. A transducer driving apparatus as set forth in claim 1, wherein said conversion means comprises a magnetic head which records data onto or reproduces data from a magnetic recording medium.

6. A transducer driving apparatus as set forth in claim 1, wherein said first and second portions of said supporting member are flat portions which are opposed and parallel to each other.

7. A transducer driving apparatus as set forth in claim 1, wherein said conversion means comprises means for recording data onto or reproducing data from a recording medium.

8. A transducer driving apparatus as set forth in claim 6, further comprising a fixing member having opposite ends which are respectively secured to said conversion means and said driving means, said fixing member being positioned such that a center of gravity of said fixing member coincides with a center of gravity of said movable unit.

9. A transducer driving apparatus as set forth in claim 8, wherein said at least one supporting means comprises two supporting means which support said movable unit at symmetrical positions with respect to the center of gravity of said fixing member.

10. A transducer driving apparatus ass set forth in claim 8, wherein said driving means drives said movable unit in a direction along a line passing through the center of gravity of said fixing member.

11. A transducer driving apparatus as set forth in claim 1, wherein said supporting member comprises a plate spring deformed to have said first, second and third portions.

12. A transducer driving apparatus as set forth in claim 1, wherein said at least one of said supporting means comprises first and second supporting means which are disposed such that the direction of said axis of said circular-arc shape in said first supporting means is perpendicular to the direction of said axis of said circular-arc shape in said second supporting means.

* * * * *